United States Patent [19]

Alger et al.

[11] Patent Number: 5,396,542
[45] Date of Patent: Mar. 7, 1995

[54] METHOD FOR USE BY A TELECOMMUNICATIONS SYSTEM IN ENABLING IMPROVED ATTENDANT SERVICES

[75] Inventors: Langdon E. Alger, Chicago, Ill.; Steven L. Greenspan, Cranford, N.J.

[73] Assignee: AT&T Corp., Murray Hill, N.J.

[21] Appl. No.: 114,725

[22] Filed: Aug. 31, 1993

[51] Int. Cl.⁶ .............................................. H04M 1/64
[52] U.S. Cl. ...................................... 379/67; 379/210; 379/265; 395/2.6
[58] Field of Search ............... 379/265, 266, 309, 210, 379/211, 212, 67, 88, 89; 395/2, 2.6, 2.63, 2.66

[56] References Cited

U.S. PATENT DOCUMENTS

| | | | |
|---|---|---|---|
| 4,054,756 | 10/1977 | Comella et al. | 379/89 |
| 4,150,255 | 4/1979 | Theis et al. | 379/84 |
| 4,436,962 | 3/1984 | Davis et al. | 379/211 |
| 4,529,841 | 7/1985 | Andersson | 379/213 |
| 4,723,273 | 2/1988 | Diesel et al. | 379/211 |
| 4,827,500 | 5/1989 | Birkerd et la. | 379/220 X |
| 4,896,345 | 1/1990 | Thorne | 379/84 X |
| 4,899,358 | 2/1990 | Blakley | 379/67 |
| 5,014,303 | 5/1991 | Velius | 379/266 X |
| 5,033,088 | 7/1991 | Shipman | 379/88 X |
| 5,073,890 | 12/1991 | Danielson | 379/309 X |
| 5,181,236 | 1/1993 | LaVallee et al. | 379/67 |

Primary Examiner—James L. Dwyer
Assistant Examiner—Daniel S. Hunter
Attorney, Agent, or Firm—Ross T. Watland; David L. Hurewitz

[57] ABSTRACT

A method where a telecommunication system records a message spoken by a caller and plays the recorded message to a human attendant for use in routing an incoming call without the attendant having to answer the incoming call. The system then responds to input from the attendant by playing the message to a third party to familiarize the third party with the call before the caller is removed from hold and the call is completed to the third party. In this manner, the first person that the caller speaks with has already listened to the message. The message is supplemented with additional voice messages or conversations as the call is handled by multiple parties. Wordspotting is used as the initial message is being recorded; if the wordspotting is successful, the recorded message is routed to a third party without any attendant involvement and the third party is familiarized with the call.

11 Claims, 6 Drawing Sheets

METHOD FOR USE BY A TELECOMMUNICATIONS SYSTEM IN ENABLING IMPROVED ATTENDANT SERVICES

TECHNICAL FIELD

This invention relates to telecommunications.

BACKGROUND AND PROBLEM

When customers call a large business, they are frequently given an auditory menu with an array of dual tone multifrequency (DTMF) options. The number of DTMF options is usually limited to a small number of choices; more than seven choices per DTMF menu would probably be considered excessive and could strain the user's short term memory. To provide a greater number of choices, such user interfaces are hierarchically constructed; a choice from one menu leads to an announcement of new choices. Users of DTMF user interfaces have complained about the unfriendliness and awkwardness of hierarchical menus and large numbers of choices. Moreover, the mapping between the particular DTMF digits (e.g., pressing "*4" on the telephone keypad) and the semantic interpretation in the user-interface (e.g., connect the caller with the trouble desk for widgets) is often arbitrary and difficult to remember. Finally, in a DTMF user interface, the caller sometimes makes the wrong choice, e.g., choosing the Merchandise Order Department instead of the Complaints Department when they are calling to complain about the delivery of damaged merchandise. Understanding what is meant by each choice is not always an easy task.

Immediately connecting the caller to an attendant leads to other difficulties. Frequently, callers need to be placed on hold. If the caller tires of waiting or if holding time exceeds some threshold, some user interfaces allow the caller to leave a message, but doing so typically terminates the call. If the caller reaches the attendant, the attendant is often unable to help them and the call is transferred to a third party. Upon reaching the third party, the caller repeats the reason for the call. If the third party decides that the call should be transferred to a rough party, the caller has to again repeat the reason for calling.

Repeating a service order, complaint, or other message from one party to the next is often a frustrating activity. To alleviate this frustration, some services have the initial attendant remain in the call until the appropriate party is reached. While this method has some desirable characteristics, the attendant is involved in each call for a longer duration thus leading to longer holding times for callers and attendants. Moreover, with each new party that the attendant calls (in an attempt to satisfy the caller's need), the attendant or the caller must repeat the reason for the call.

In all these cases, the caller's response to frustration, intimidation-by-auditory-menu, or being asked to repeat the request, may be to disconnect. This may lead to customers with negative impressions of the business, and to loss of future sales. Receiving and redirecting calls can also overwhelm attendants. Frequently they have to answer calls and immediately place them on hold.

SOLUTION

These problems are solved and a technical advance is achieved in accordance with the principles of the invention in a method where a telecommunication system records a message spoken by a caller and plays the recorded message to a human attendant for use in routing an incoming call, significantly without the attendant having to answer the incoming call. The system then responds to input from the attendant by playing the message to a third party to familiarize the third party with the call before the caller is removed from hold and the call is completed to the third party. In this manner, the first person that the caller speaks with has already listened to the message. The message is supplemented with additional voice messages or conversations as the call is handled by multiple parties. Wordspotting is used as the initial message is being recorded; if the wordspotting is successful, the recorded message is routed to a third party without any attendant involvement and the third party is familiarized with the call.

Figure 1:
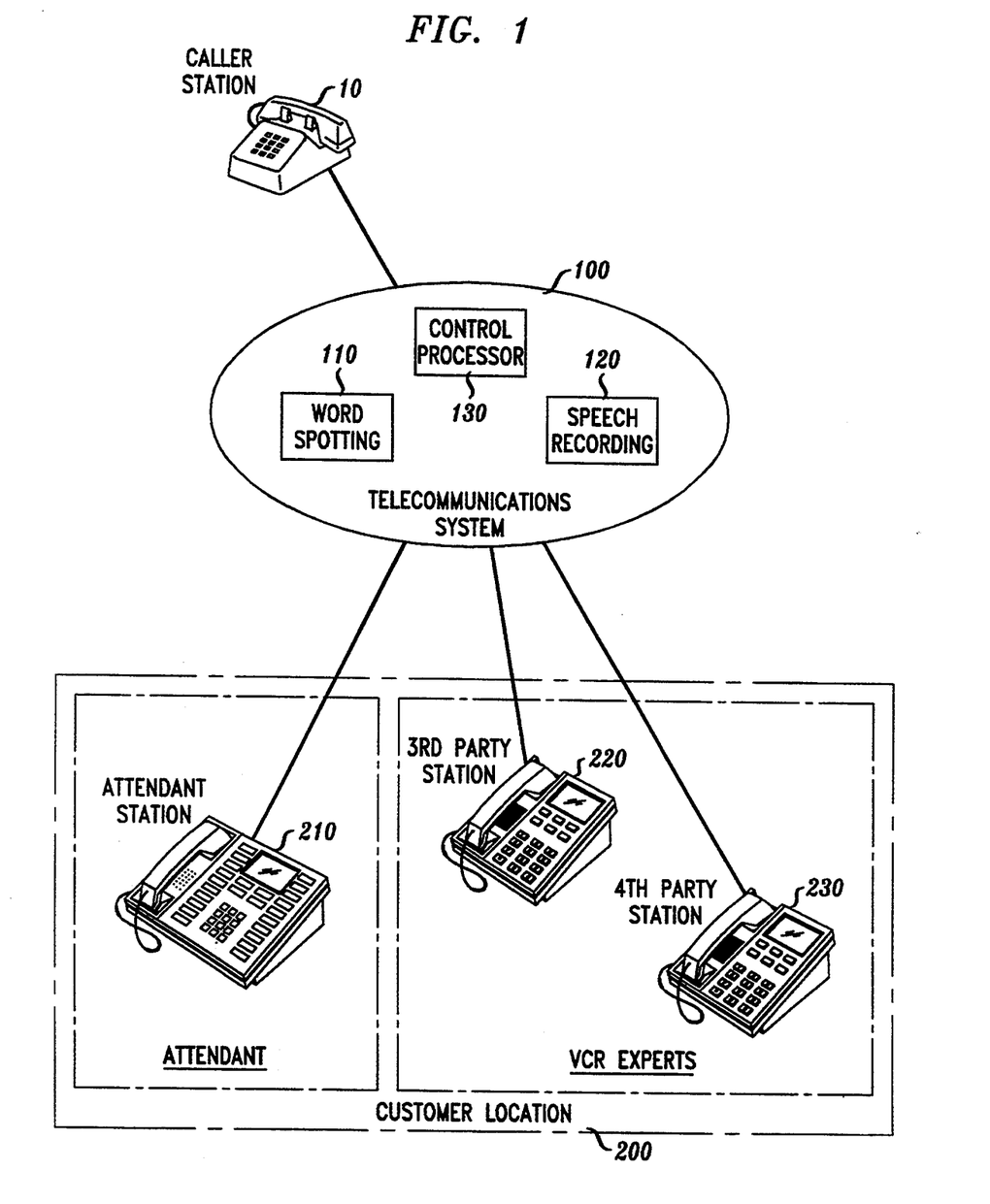
FIG. 1 is a diagram of an arrangement including a telecommunications system, which performs the exemplary methods of the invention, to provide improved attendant services for a customer location.

FIG. 1 is a diagram of an arrangement including telecommunication system 100, which performs the exemplary methods of the invention, to provide improved attendant services for a customer location 200. Telecommunication system 100 is implemented as a stored program control switching system, e.g., the AT&T 5ESS ® switch described in the AT&T Technical Journal, July–August 1985. System 100 includes control processor 130, programmed to perform the exemplary methods of the invention, as well as wordspotting unit 110 and speech recording unit 120. Alternatively, system 100 may be implemented using a switching system together with a switch adjunct, e.g., a service node of the type disclosed in the AT&T A-I-Net ™ Service Circuit Node (SCN) System Description and the AT&T A-I-Net ™ Product Technical Specifications Release 1, both of Apr. 15, 1992. At customer location 200, e.g., a large department store, an attendant station 210 is used by an attendant in handling all incoming calls. Alternately, multiple attendant stations may be used for this purpose. Third party station 220 and fourth party station 230 are used by individuals in the consumer electronics department that are experienced in VCRs. Caller station 10 in FIG. 1 is used by a caller in the exemplary methods herein.

Consider the following example. A caller at caller station 10 dials a general directory number of customer location 200. System 100 receives the incoming call, but rather than connecting the call through to attendant station 210, system 100 prompts the caller for a spoken message using an open-ended question such as "How can we help you?". System 100 controls recording unit 120 to record the message spoken by the caller. System 100 then places the incoming call on hold, and queues both the incoming call and the recorded message. When the attendant at station 210 becomes available, system 100 plays the recorded message to the attendant while the caller remains on hold. If the attendant can determine how to route the call from the recorded message, the attendant, rather than answering the incoming call, simply provides input, e.g., pushing a button or dialing digits, from station 210 sufficient to enable system 100 to route the incoming call to third party station 220. Before completing the incoming call and while the caller remains on hold, system 100 first plays the recorded message to the third party to familiarize the third party with the caller's request. (System 100 provides an alerting signal to the third party which the third party responds to before the message is played.) If, after listening to the message, the third party does not take the call, the third party may provide input from station 220 sufficient to enable system 100 to route the incoming call to the fourth party at station 230 or the call may be returned automatically to the attendant at station 210.

The recorded message may be supplemented with additional voice messages or conversations as call handling progresses. For example, after each playing of the message, the listening party may request system 100 to record via unit 120 a voice message to further familiarize a subsequent party with the call. In cases where a party, e.g., the attendant or third party, listens to the message and then answers the call, the ensuing voice communication is recorded by unit 120 for provision to a subsequent party in addition to the message.

As a further enhancement, while recording unit 120 is recording the initial message from the caller, system 100 controls wordspotting unit 110 to detect any one of a large number of predetermined words, e.g., VCR, TV, dishwasher, air conditioner, service, etc., in that message. If the word VCR is detected, system 100 plays the recorded message to a VCR expert at third party station 220 to familiarize the VCR expert with the caller's request prior to accepting the incoming call. If none of the predetermined words is detected, the recorded message is played to the attendant at station 210 and the call handled as described above.

In accordance with the method, the telecommunication system is able to automatically (a) receive calls, (b) prompt the caller for a message, (c) place the caller on hold, (d) buffer the voice message voice recording, and (e) submit it to a queue that can be accessed by human attendants prior to talking with the caller. The message can then be used to route calls to the appropriate person (e.g., a service agent). The service agent may also listen to the voice message before talking with the caller. In the meantime, the caller need not be bothered by talking with a series of service agents, repeating the same information over and over again. In an emergency setting, the human attendant can quickly prioritize calls, transferring low-priority calls to another queue, while high-priority calls are transferred to attendants with the appropriate skills.

This method offers the advantages of present automated answering and forwarding systems that rely on DTMF input by the caller in order to route calls, but also offers the following advantages: 1) the caller doesn't have to listen to a "canned menu" recording upon calling the company; 2) the caller doesn't have to wait to listen to all possible options before they can be sure of which option they want to select; 3) the caller can ask for a person directly, instead of having to opt for an operator who can then transfer the call to the intended party's line; 4) there is a lower probability for ambiguity in selection by the caller; 5) the caller can ask for what they want, instead of having to decide which option on the front-end of a DTMF-based system is appropriate; and 6) callers who use dial-pulse voice terminals don't have to be hampered by waiting for a live operator to get the call, since there is no DTMF interaction required at the front-end of the call.

DETAILED DESCRIPTION

The following description is arranged as follows. First a basic application scenario and the associated methods performed by system 100 are described using a state-event format. A number of advanced features of the method are then presented. Finally, a particular advanced application scenario and the associated methods performed by system 100 are described using the state-event format.

Basic Application Scenario

Figure 2:
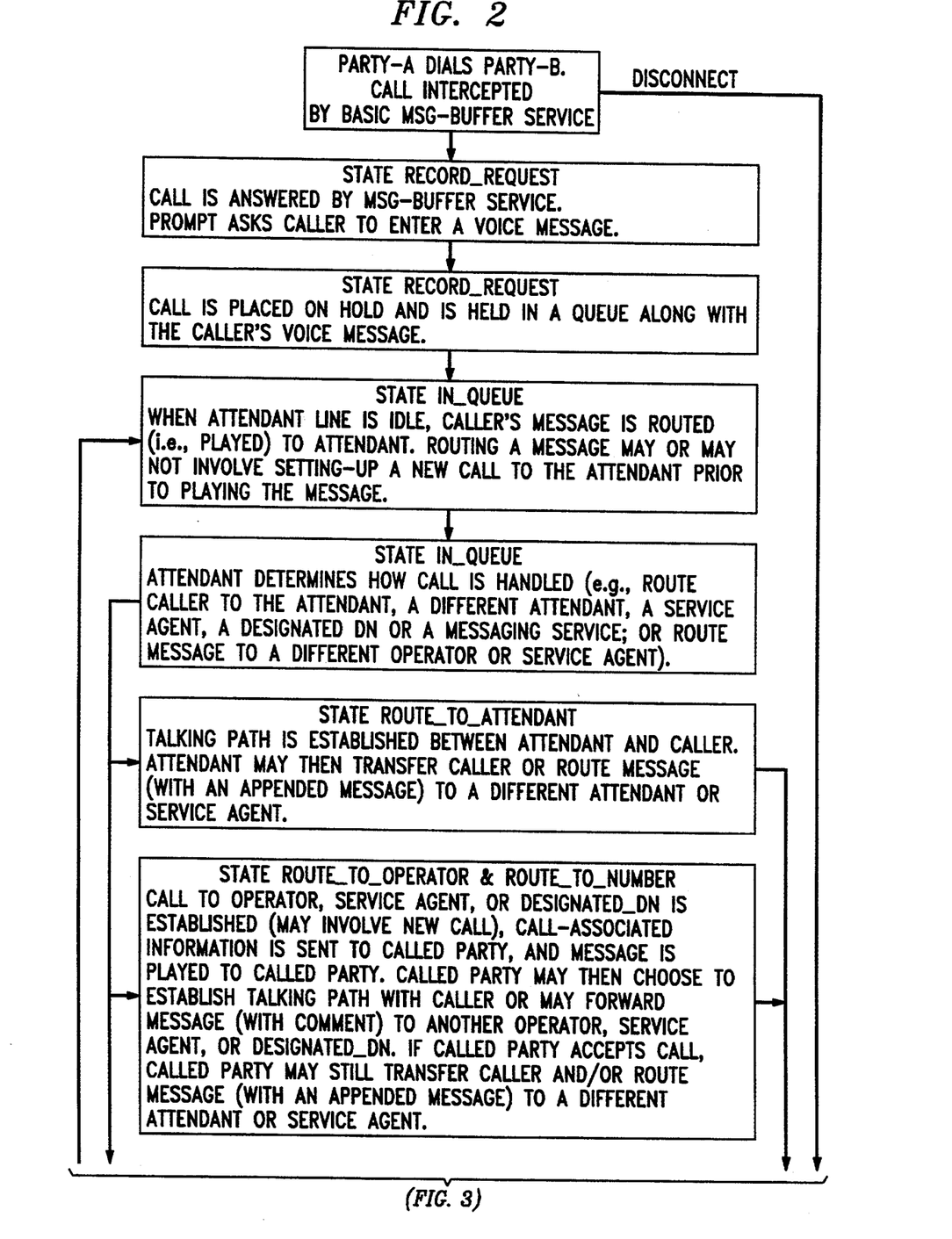
FIGS. 2-3 represent a flow chart of telecommunications service software used to support a Basic Application Scenario.
Figure 3:
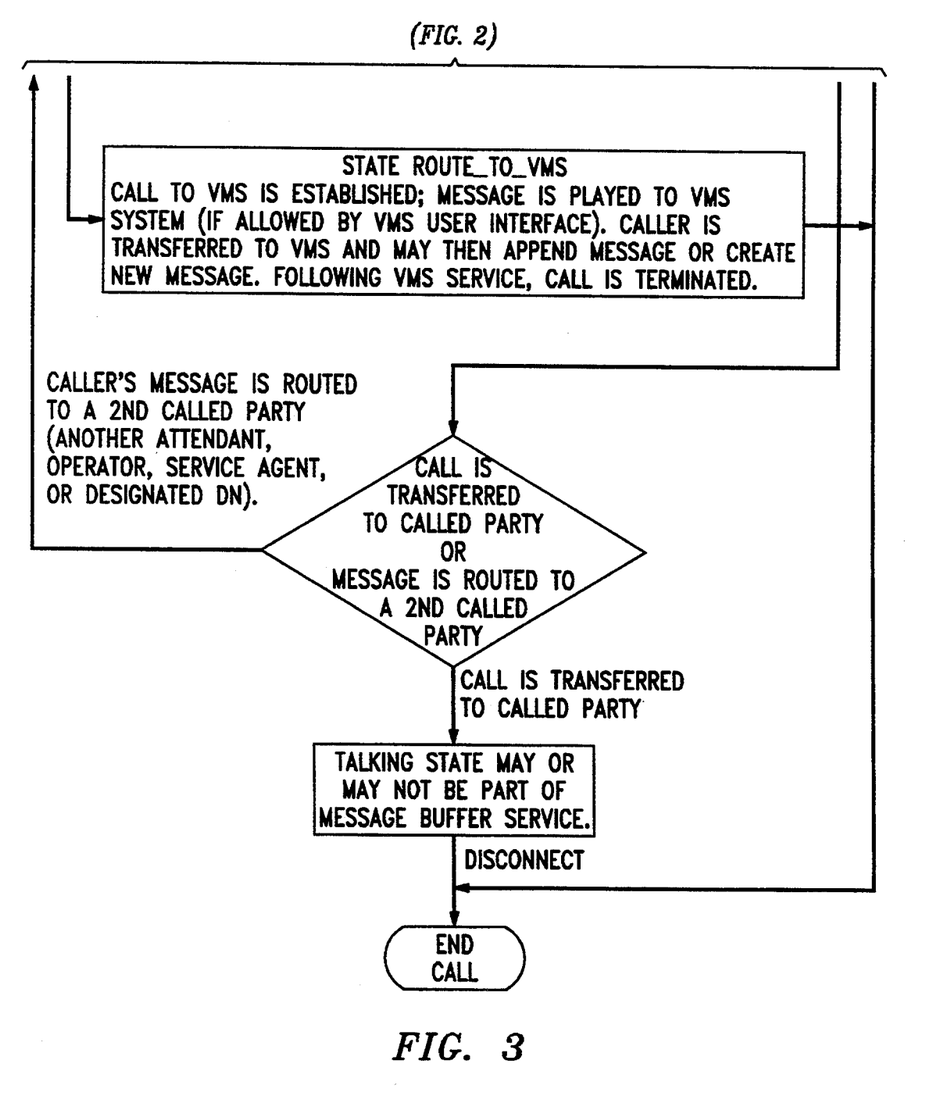

The flow of a typical call would be as follows:
1. A person calls the general directory number (DN) for a company. The person's call is answered by the system
2. The service prompts the caller and buffers the response.
   a. The caller is given a brief prompt to record something (e.g., "Hello, what department do you wish to speak to?").
   b. The system begins recording the caller's response.
   c. The caller replies to the prompt (e.g., "Yes, I'd like the sales department please", or "Lee Drake, please").
   d. The system terminates the recording automatically (given some small number of seconds of silence).
   e. The system responds to the caller (e.g., "Please hold on the line while we transfer your call.")
3. The caller is placed on hold, and the system queues the buffered recording for delivery to a live attendant.
4. When it is the recording's turn to be sent to the attendant (e.g., an attendants line is idle):
   a. The attendant's voice terminal is alerted (unless the system is set up to keep a nailed-up call between the system and the attendant).
   b. The attendant answers the call (or indicates they are ready for the next voice recording).
   c. The attendant is played the caller's voice recording, e.g., "Yes, I'd like the sales department please"
5. Based upon what the attendant hears, the attendant then routes the caller's call appropriately (to the sales department DN, to Lee Drake's DN, etc.)
6. If the recording was indiscernible, the attendant could elect to have the call routed to the attendant, so that the caller can be further prompted for more information, in order for the attendant to appropriately route the call. State Model Representation of the Basic Scenario The following description represents a finite state model of telecommunications service software that supports the basic call scenario (see FIGS. 2-3). state Initial event Incoming—Call The call flow begins in this state, with this event. The arrival of this event initiates call processing. The Incoming—Call event is generated when a call is made to a customer's directory number, for purposes of obtaining service.

The first action taken in this state is to accept the incoming call and answer it.

end event Call_Answered

Once the call was successfully answered by the service, there would be a transition to the Record_Request state.

state Record Request event Initial_Event

This event would occur whenever this state was entered. The first action in this state would be to play a brief pre-recorded prompt to the caller, requesting that the caller state their request.

This prompt could be tailored to meet the specific customer's service, and might range from "Please speak the name of the person you are calling" to "Good afternoon, how may we help you?" The latter prompt is the one upon which this scenario will be based.

event Prompt_Completed

Once the prompt was played, the service would then begin recording the caller's response to the prompt. The recording would continue until silence from the caller was detected for a service-dependent period of time.

event Request_Recorded

Once the recording was created successfully, the system would store the voice recording, as an encoded speech file. For purposes of the explanation for this scenario, let us assume that the caller's message was "Hello, I'm having some trouble with my software upgrade, and I was wondering if you could help me."

The service would then play a pre-recorded voice message in response to the caller. This message would be tailored to meet the specific needs of the service. For example, the message might be "Please hold the line while we route your call to the appropriate department to handle your request."

event Response_Played

At this point, the service would put the caller on hold (providing silence to them, or recorded music, etc.), and queue the caller's request. This means that the information about the caller, and the name of the caller's recorded message file, would be passed to a first-in-first-out (FIFO) queue controller/spooler.

event Caller_Queued

The successful queueing of the caller's message would cause a transition to the In_Queue state.

state In Queue event Initial_state

While the service is in this state, the caller would remain on hold. The service would wait in this state until the FIFO queue controller sent a message indicating that it is time to handle the caller's message.

event Play_Request

The service, upon receiving this event, would route the caller's request to the attendant that signalled the request. In the simplest case, this would mean that the caller's recording would be played over the nailed-up phone call which the human attendant is monitoring. In the more complex case (which is not discussed here), a new call might be started, in ACD or direct-call fashion, to one or a bank of human attendants.

In any case, the caller's recorded message would be retrieved from storage, and played to the human attendant.

event Request_Played

At this time, the service control would be at the hands of the attendant that listened to the caller's recorded request. The attendant would, based upon their understanding of the message that they heard, elect how to handle the caller's call by pressing one or more DTMF digits, which the service would hear and translate.

event Digits_Collected

As a part of this event, the service would be told what the attendant's decision was from the standpoint of how to handle the call, based upon the digits that were received by the service from the attendant. Depending upon the complexity of the service or the customer's version of it, this decision could be any one of the following: 1) a request that the caller be routed to a live operator (either a specific one or a group of them, in order to have one selected in an ACD-fashion), for the purposes of obtaining more information, or in the case where the request was indiscernible for some reason (e.g., a faulty recording was made, there was too much noise in the caller's background, the recording was made in a foreign language, etc.) [transition to Route_To_Operator state]; 2) a request that the caller's message be re-played to the attendant so that they may listen to the message again [no state transition made, but the Play_Request event would be generated again]; 3) a request that the caller be routed to the attendant, so that the attendant could speak to the caller directly in order to clarify the caller's request [transition to Route_To_Attendant state]; 4) a request that the caller be transferred to a specific service department or person (in our example, it might be the Software Upgrade Customer Support department, but it might be an individual's telephone number, etc.) [transition to Route_To_Number state]; 5) a request that the caller be transferred to a system-wide, departmental, or personal voice messaging service, which could be contained within the Buffering service or an external messaging service [transition to Route_To_VMS; or 6) an automatic decision made by the service to route the caller to a default state in the case where the queue time for the caller reached a service maximum period for whatever reason (attendant never received the request, the queue was too long, etc.). In this case the service would make a state transition to whichever of the states mentioned above which is appropriate, presumably after being provided a status/instruction message.

state Route To Operator event Initial_Event

In this event, a request would be issued that the caller be taken off hold.

event Off_Hold

The caller would then be transferred to an operator. This operator might be a single directory number, or a hunt-group type of numbers. In addition, the operator(s) may or may not have nailed-up calls into the service, thereby allowing them to receive calls without having to generate a new outgoing call from the service. The service would determine which operator or set of operators to send the caller to based upon the digits that the attendant entered in the previous state. This set of digits might be as simple as the single DTMF O, or as complex as an entire directory number.

event Call_Routed

The service would remain in control of the call, in order to assist the receiving operator's request for call redirection. The service would await the operator's command, through some sort of call-associated signalling, as to how to route the call.

event Digits_Collected

The call handling in this event would be directly similar, if not the same, as it was in the case for the Digits_Collected event handler in the previous state.

state Route To Attendant
   event Initial_Event
   In this event, a request would be issued that the caller be taken off hold.
   event Off_Hold The caller would then be transferred to an attendant. The difference between this state and the Route_To_Operator state is that there would be no need for the call-associated signalling.
   event Call_Routed
   The service would remain in control of the call, in order to assist the receiving operator's request for call redirection. The service would await the attendant's instructions as to what to do with the call.
   event Digits_Collected
   The call handling in this event would be directly similar, if not the same, as it was in the case for the Digits_Collected event handler in the previous state.
state Route To Number
   event Initial_Event
   The service would initiate a new outgoing call to the specific extension or directory number that was specified by the operator or attendant.
   event Call_Answered
   Assuming the call was answered., the service would play a message to the person that answered the call. The service might play an introductory announcement to the callee first (e.g., "You have an incoming service call; the caller's initial statement follows."). In any case, the service would then play the voice file which was recorded from the caller's initial request.
   event Message_Played
   The next step would be the issuing by the service that the caller be taken off hold.
   event Off_Hold
   The caller would then be connected to the new outgoing call. The service could then either stay on the call, for further control to take place after the person handling the call was finished or for subsequent rerouting, or the call would be completely transferred to the callee, and the service would drop out of the control loop for the call.
   event Call_Transferred
   The service would at this point drop out of the scenario completely, as the caller and the transferee would interact. At this point there would be a transition to the Clean_Up state.
state Route To VMS
   event Initial_Event
   In this event, a request would be issued that the caller be taken off hold.
   event Off_Hold
   The caller would then be transferred to a voice messaging service. This would be a service inside of the buffering service, or some external system or CPE.
   event Call_Routed
   The service would no longer have any control of the call at this point, and would transist to the Clean_Up state.
state Clean Up
   event Initial_Event
   Upon arrival to this state, the service might or might not delete the voice file that was created by recording the caller's initial request for service. In the case where the caller was transferred to a VMS or a specific service handler's number, the voice message would probably be deleted.
   The voice recording might be saved, however, for future analysis for service evolutions, including the use for training ASR systems on the words that callers use to request assistance. If the recording was not deleted, then the service would return to the Initial state.
   event Message_Deleted
   At this point, the service would return to the Initial state.

Advanced Features 1. attendant service features: Many of the attendant features that presently apply to call management can be applied to the message buffering service (e.g., attendant even call distribution (ACD), attendant position busy, attendant conference calling, emergency access to attendant, automatic call distribution, agent position monitoring, and customer alerting)

2. algorithmic message distribution: In addition to the many ACD-like features that can be applied to message buffering, a message can be distributed to different called parties (e.g., different attendants) on the basis of automatically recognized message properties. For example, messages can be distributed using: a. message length (long messages may be delivered to one set of attendants, short messages to another set of attendants, under the assumption that longer messages may require attendants to interact more with the caller, before transferring the message), or b. an automatic speech recognition system could monitor for certain key words (e.g., 'sales', 'help!', and 'complaint') and distribute messages as a function of these recognized key words.

3. billing: Typically, transferring a call creates a second billing record (for the call from the transferred-from party to the transferred-to party. In message buffering, special billing services could permit creation of a second bill only when a called party answers the call and talks with the caller.

4. multiple buffers: attendants can listen to the message, and then place the message (and its associated call) onto a specific message buffer (targeted to another group of attendants or service agents); or ( similar to some ACD systems) algorithmic message distribution features can be used to distribute calls to different message buffers.

5. message parking: Similar to call parking, instead of the system distributing messages to attendants, message parking would allow attendants to indicate to the system that they wish to hear the next message in the queue. The next message could be the next one selected by algorithmically by the system, or the attendant could indicate a desire to listen to messages from calls that have been held for more than or less than N seconds, or calls from (or not from) specific geographic regions.

6. message buffering on busy/no-answer: Rather than buffering all calls, calls can be normally delivered to an attendant, but if no attendant station is idle, then the caller is asked to provide a message for message buffering.

7. multi-way message monitoring: In a variant of the message buffering on busy/no-answer feature, attendants can listen to messages as they arrive, and interrupt, buffer, or transfer the message. If the call traffic exceeds the attendants' capacity, messages can then be buffered. Note, the number of attendants that can simultaneously listen to the message queue need not be restricted to one. For example, one attendant may monitor strictly for emergency calls, another for "difficult" cases, while the attendants receive calls according to the aforementioned distribution schemes.

8. predefined message delivery sequences: an attempt is made to deliver the message to a predefined sequence of destinations until the called party at one destination accepts the call. If no called party accepts the call, the call could be delivered to a predefined destination (which answers the unwanted calls) or to a voice messaging system). For example, an incoming call is received, and the caller is prompted for a message and asked to stay on the line. The system attempts a call-setup to party B. If party B answers, the message is played to party B who may accept or decline the call. If party B declines the call or does not answer (busy/no-answer), then the next party in a hunt list, i.e., party C, is called. The hunt through the hunt list could be based on a variety of algorithms including top-to-bottom for each call, round-robin (the first called dn, i.e., party B is the dn listed after the party that accepted the previous call or that was first called on the previous call), or an ACD algorithm sort taking into account number of calls and call connection time handled by each hunt group member during the past n minutes. Thus sequential messaging involves a single outbound call at any time.

9. message broadcast: the message is broadcast to multiple destinations, the first called party to accept the call, receives the call. For example, an incoming call is received and the caller is prompted for a message and is asked to stay on the line. The system attempts to call everyone on the list of possible called parties in a concurrent fashion. In distinction from sequential dialing, outbound calls are placed to party B and C, etc., at substantially the same time. Assume that party B answers first. The message is played to party B. Meanwhile, party C answers. The message (starting from its beginning) is played to party C. Assume that when party B has finished listening to the message, party C is in the middle of the message. At this point, party B accepts the call. Party C's message is then interrupted with a signal indicating that the call has been accepted by another called party, party B.

10. message transfer: In the Basic Scenario, the message is listened to by a called party, who then transfers the call to a second called party who then answers the call. However, message transferring allows the second called party to listen to the message before answering the call. If the this second called party wishes to, the caller can continue to be kept on hold, and the message can be transferred to a third called party who can then answer the call. The number of permitted message transfers can be uncontrolled or could be set to a finite number, such as two. In the latter case, the third party would only be allowed to answer the call or (possibly) have it transferred to a voice messaging system.

11. message transfer following answer: a called party can listen to a message, answer the call, then transfer the call and the message to a second called party. The second called party would hear the message, and elect to answer the call, and/or transfer the call (and message) to a third called party.

12. message transfer with return on busy/no-answer: This feature guarantees that the call/message is returned to the first called party (e.g., an attendant) if the transferred message is not listened to because of busy, no-answer, or excessive call holding time.

13. attendant recall: This feature permits a second called party to signal that the message should be transferred back to the first called party with an appended message from the second called party. Notably, the second called party need not know the network address of the first called party. This feature may be invoked before the call is answered, while the second called party is talking with the caller, or immediately after disconnecting the caller. The service behavior would differ, of course, depending upon when the feature is invoked.

14. message archiving: a called party can listen to a message, elect to answer the call, but also have the message stored in a (group or private) message archive for later analysis.

15. call queue thresholds: After exceeding some threshold, the call (and message) can be delivered to a predetermined service desk or a particular attendant, or the call (and/or the message) can be transferred to a voice messaging system.

16. message buffering measurements and reports: a variety of services could offer special measurements and reports based upon quantities such as call holding times, number of transfers within a call, number of times the call is answered by the second called party (in the case of an attendant service, this would be the party who received the call from the attendant, so the measurement helps identify the attendant's skill in routing calls).

17. mult-media message buffering: In a multimedia telecommunications network, the message could contain, for example, voice, video, and graphic data. The above features could be applied to multi-media calls as well as to purely auditory calls.

18. retrieving from an archive, a listing of message headers and the message headers, themselves, based on an incoming call identification number, e.g., originating dn or account code.

19. providing incoming callers the same attendant or service person every time they call.

Advanced Application Scenario

The flow of a call for an advanced application might be as follows:
1. A person calls the general DN for a company. The call is answered by the system.
2. The service buffers a message from the caller.
   a. The caller is given a brief prompt to record the reason for calling (e.g., "Hello, how can we help you today?").
   b. The system records the caller's response.
   c. The caller speaks their response (e.g., "I am having troubles programing my new VCR.")
   d. The system's word-spotting mechanism recognizes the word VCR, and prioritizes the call.
   e. The system uses the caller's telephone number (the ANI) to check for previous history with the customer.
   f. System either prompts the caller automatically for the VCR model number, or the call is given temporarily to an attendant who prompts the caller for the information; model information is buffered as well as the caller's original spoken message.
3. Caller is placed on hold, and the call is put on a priority queue. The queue is for VCR experts:
   a. Priority goes to expert who most recently worked with customer.
   b. If that expert is unavailable, busy, or on vacation, call gets put into general priority queue (of experts with same general level of expertise).
4. Experts are given the calls on the queue sequentially or serially.

a. expert 1, when free, might hear the same call's buffered message as expert 2, and call will go to the first expert that indicates that they can take it; or,
b. expert 1 will hear the buffered message, and if they cannot take it, expert 2 will be passed the buffered call information, etc.
5. Once expert accepts call, they hear the buffered information and can also pull up customer and VCR model records, in order to work more efficiently with the caller.
6. Expert discusses problem with caller, and solves their situation.
7. Caller disconnects.
8. Expert logs any pertinent information, such as how problem was solved, etc., and all information is archived for future analysis, review, etc.
9. System automatically adds measurement data (call duration, queue time, expert ID number, etc.) before archiving it along with buffered messages.
10. If expert that would normally handle the call was unavailable, or on vacation, the archived records could be reviewed by them in order to get better understanding of what customer's problems were.

State Model Representation of the Advanced Scenario

Figure 4:
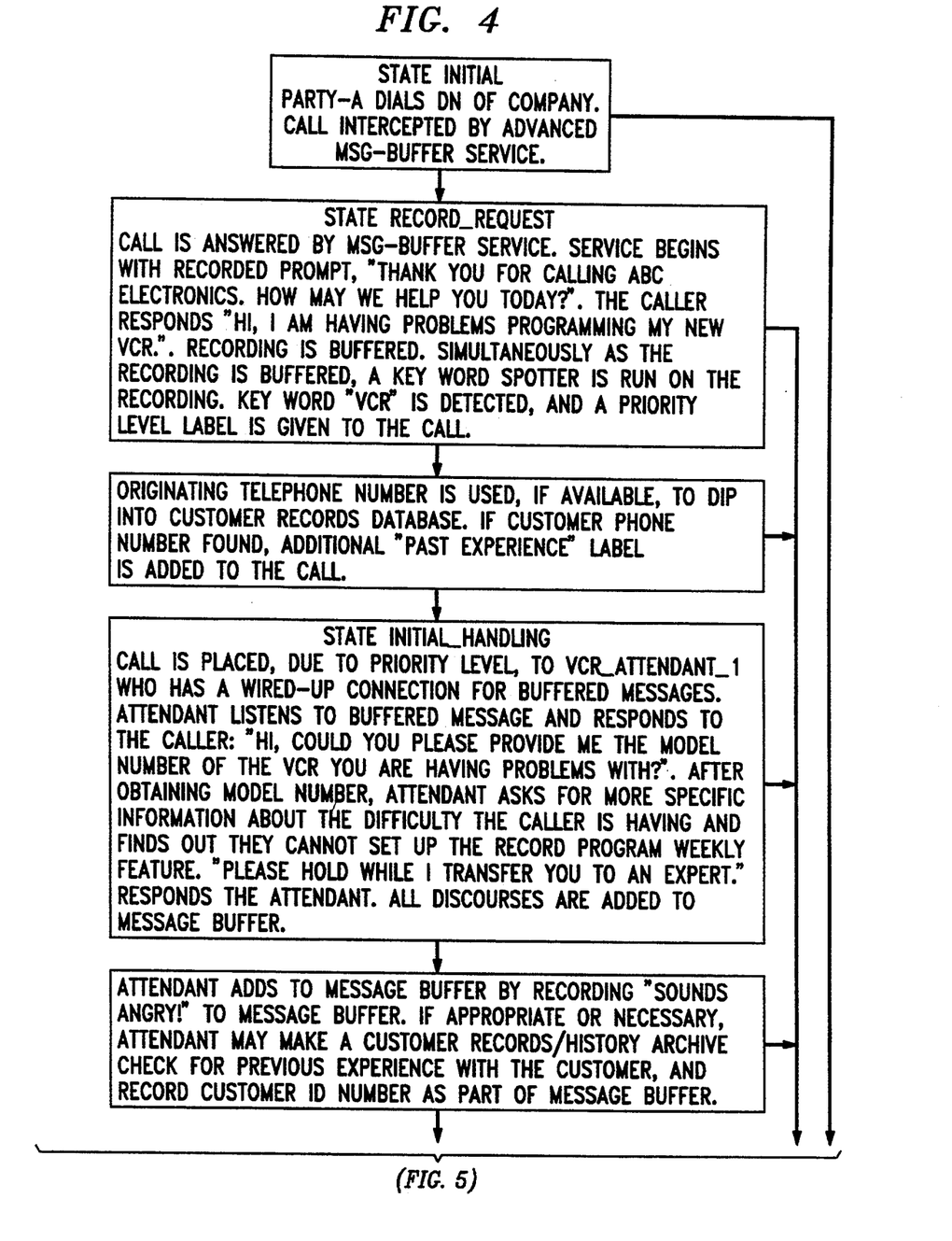
FIGS. 4-6 represent a flow chart of telecommunications service software used to support an Advanced Application Scenario.
Figure 5:
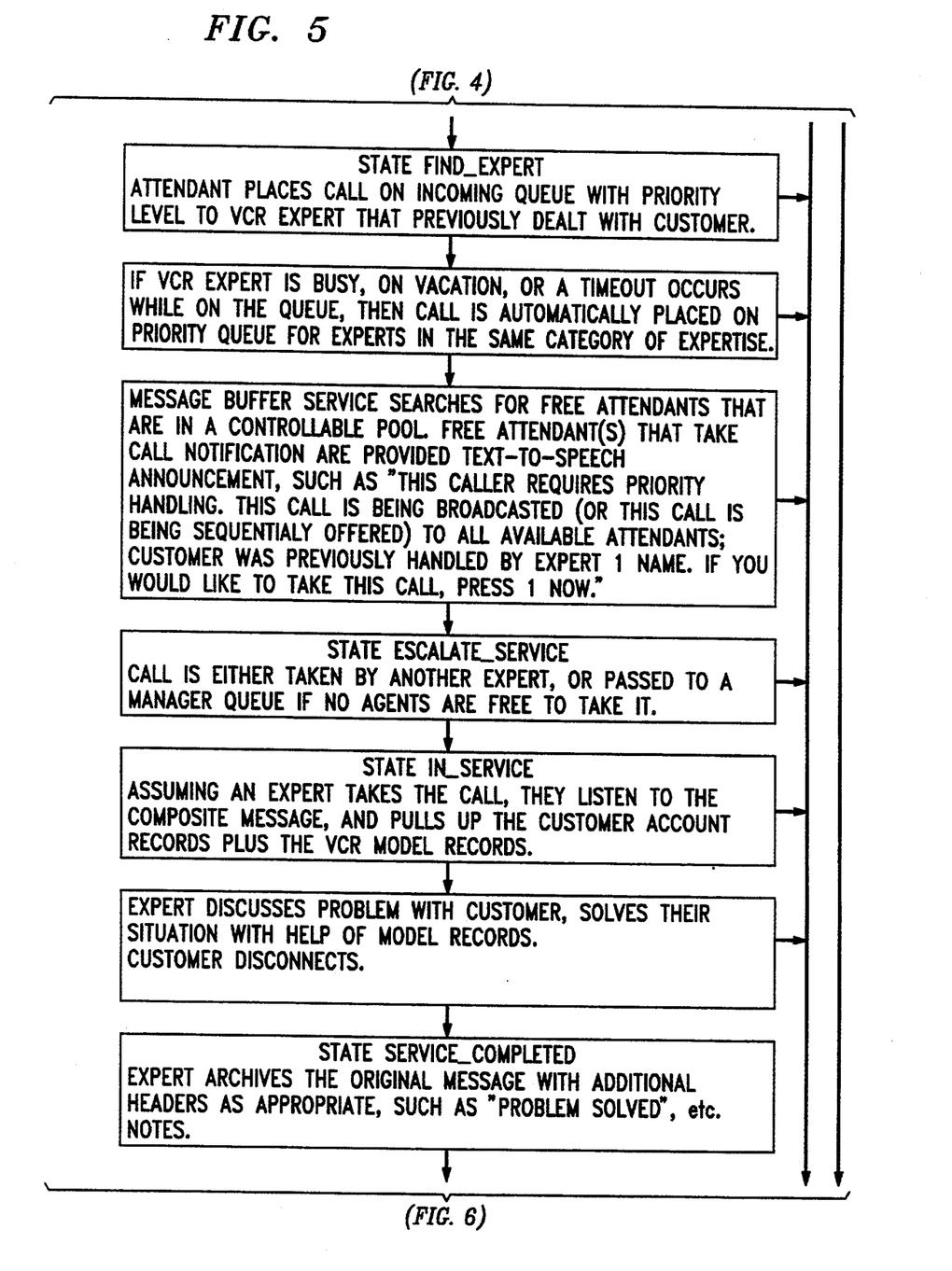
Figure 6:
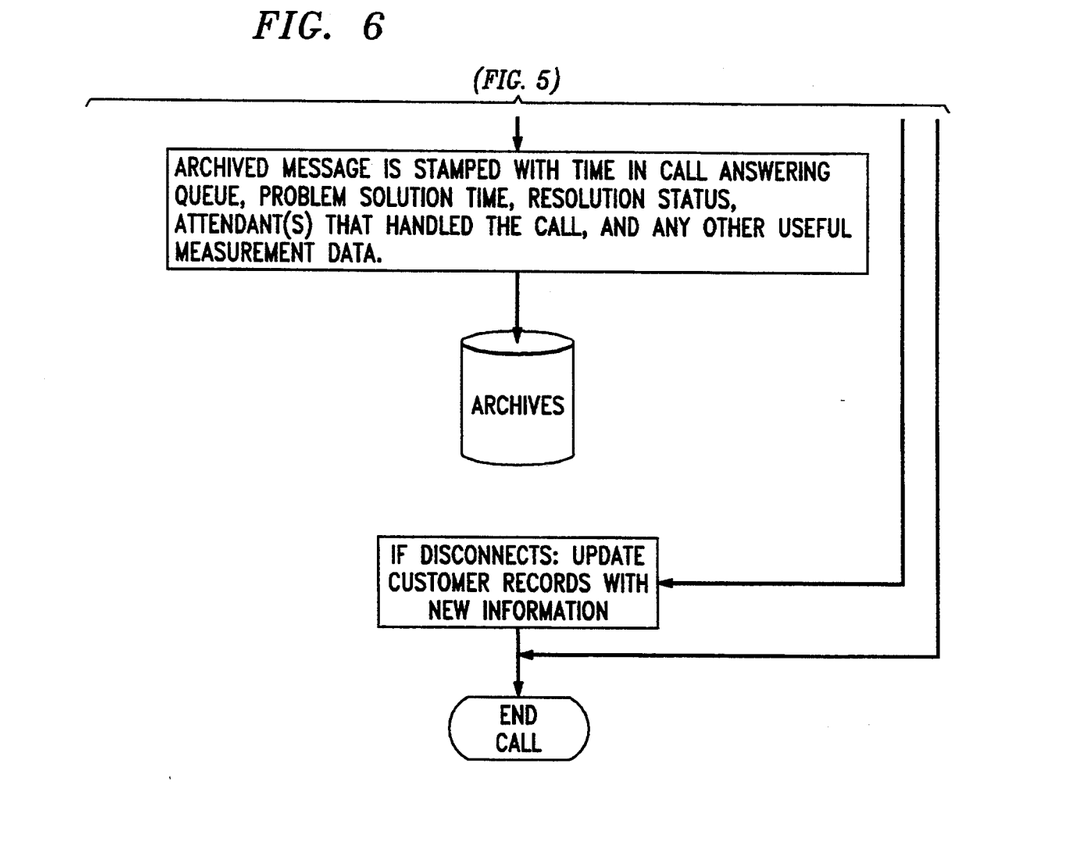

The following description represents a finite state model of telecommunications service software that supports the advanced application scenario (see FIGS. 4–6).

state Initial
  event Incoming_Call

The call flow begins in this state, with this event. The arrival of this event initiates call processing. The Incoming_Call event is generated when a call is made to a customer's directory number, for purposes of obtaining service.

The first action taken in this state is to accept the incoming call and answer it.

event Call_Answered

Once the call was successfully answered by the service, there would be a transition to the Record_Request state.

state Record Request
  event Initial_Event

This event would occur whenever this state was entered. The first action in this state would be to play a brief pre-recorded prompt to the caller, requesting that the caller state their request.

This prompt could be tailored to meet the specific customer's service, and might be on the order of "Good afternoon, how may we help you?" The latter prompt is the one upon which this scenario will be based.

event Prompt_Completed

Once the prompt was played, the service would then begin recording the caller's response to the prompt. The recording would continue until silence from the caller was detected for a service-dependent period of time.

event Request_Recorded

Once the recording was created successfully, the system would store the voice recording, as an encoded speech file. For purposes of the explanation for this scenario, let us assume that the caller's message was "Yes, I'm having trouble programming my new VCR." Once the request was recorded, a transition to Initial_Handling state would occur.

state Initial Handling
  event Word_Spotted

While recording the message from the caller, the system was using a word spotting mechanism that allowed the system to realize that the word "VCR" was uttered by the caller. The words that could be recognized would be dependent upon the type of service the company offered, but would be tailored to the customer's needs.

The fact that the word was recognized would cause the system to automatically connect with a live attendant, based upon a priority level attached to certain recognized words.

event Attendant_Received

This event would trigger another recording to begin, and the attendant would prompt the caller for the model number of their VCR. This step could be eliminated if the caller's phone number was provided with the call information, because the ANI could be used to locate the caller's customer records, and the VCR model & purchase history could be added to the message buffer via text-to-speech, or in an Account Match fashion.

event Customer_Identified

At this point, the service would put the caller on hold of some sort (providing silence to them, or recorded music, etc.), and queue the caller's request. This means that the information about the caller, and the name of the caller's recorded message file, would be passed to a first-in-first-out (FIFO) queue controller/spooler. In this case, it would be a priority queue.

event Caller_Queued

The successful queueing of the caller's message would cause a transition to the Find_Expert state.

state Find Expert
  event Expert_Found

If this event was given to the service, then the expert that should handle the caller was available and willing to take the incoming call. The next event would be the Play_Request event.

event Expert_Busy, Expert_Not_Found, Expert_On_Vacation

If any of these events arrived to the service, then the service would actively hunt for a free expert, preferably one with similar abilities as the one who would normally handle the caller. The service might provide a notice to each available expert, in a serial or simultaneous fashion; in either case, the expert that takes the call would have to indicate their willingness, causing the service to experience the Secondary_Expert_Selected event.

event Secondary_Expert_Selected

Obtaining this event would cause the service to issue the Play_Request event.

event Find_Expert_Timeout

If this event arrived, then a suitable expert could not be found within the service parameters, and thus the transition to the Escalate_Service state would occur.

event Play_Request

The service, upon receiving this event, would route the caller's request to the expert that opted to handle the call. This would mean that the caller's recording would be played over the nailed-up phone call. In addition, the customer record identifier and the VCR model information would also be relayed to the expert.

event Request_Played

At this time, the service control would be at the hands of the expert that listened to the caller's recorded request. The caller would be connected to the expert, and the service would move to the In_Service state.

state Escalate Service
    event Initial_Event
        If the service was to get to this state, then the receipt of this event would cause escalation to begin. Depending upon how the service was configured, different escalation procedures might take place. In the case of this scenario, the call would be put on a manager's queue, in order to get a manager's attention.
    event On_Queue
        Once the call was in this state, and this event received, the service would wait for a manager to handle the call.
    event Manager_Received
        This event would indicate that a manager has taken the call. The service would make a request to play the caller's message.
    event Play_Request
        This event would trigger the caller's message to be played to the manager.
    event Request_Played
        Once the message completed playing, this event would be experienced. The call would then move to the In Service state, or the manager could manually move the call to the Service_Completed state.
state In Service
    event Initial_Event
        This event would be an indication that the caller was getting service. The service would wait until the next event.
    event Call_Completed
        Receipt of this event would indicate that the caller has finished obtaining service, so the system would move to the Service_Completed state.
state Service Completed
    event Initial_Event
        Receipt of this event would trigger the service to offer the expert or manager that handled the call an opportunity to add more information to the message that the caller originally left.
    event Message_Augmented
        Upon receiving a service-dependent amount of silence, or obtaining the expert's explicit request to stop recording, the augmentation of the caller's message would be stopped. The service would then collect measurement information and, as part of this state, add it to the caller's history.
    event Measurements_Added
        Receipt of this event would trigger a request by the service to archive the call history and message.
    event Call_Archived
        Once the call was appropriately archived, the transition to the Clean_Up state would occur.
state Clean Up
    event Initial_Event
        All call-related resources are released in this state.
    event Resources_Deallocated
        At this point, the service would return to the Initial state.

It is to be understood that the above-described embodiments are merely illustrative of the principles of the invention and that many variations may be devised by those skilled in the art without departing from the spirit and scope of the invention. It is therefore intended that such variations be included within the scope of the claims.

We claim:

1. A method for use by a telecommunications system, said method comprising
    receiving an incoming call from a caller,
    recording a message spoken by said caller in response to prompting by said system,
    playing said message to an attendant,
    receiving from said attendant an input based on said message, and
    in response to said attendant input but without said attendant answering said incoming call, playing said message to said third party in response to said attendant input,
    following the playing of said message to said third party and in response to an input from said third party, completing said incoming call to a third party,
    following said completing, recording a voice conversation between said caller and said third party, and
    in response to a further input from said third party, playing said recorded message and said recorded voice conversation to a fourth party based on said further third party input.

2. A method for use by a telecommunications system, said method comprising
    receiving an incoming call from a caller,
    recording a message spoken by said caller in response to prompting by said system,
    playing said message to an attendant,
    receiving from said attendant an input based on said message, and
    in response to said attendant input but without said attendant answering said incoming call, playing said message to said third party in the response to said attendant input,
    following the playing of said message to said third party and in response to input from said third party, playing said message to a fourth party based on said third party input.

3. A method in accordance with claim 2 further comprising
    after playing said message spoken by said caller to said third party but without said third party answering said incoming call, recording a message spoken by said third party, and
    in response to input from said third party, playing said message spoken by said caller and said message spoken by said third party, to said fourth party based on said third party input.

4. A method for use by a telecommunications system, said method comprising
    receiving an incoming call from a caller,
    recording a message spoken by said caller in response to prompting by said system,
    playing said message to an attendant,
    receiving from said attendant an input based on said message, and
    in response to said attendant input, recording a message spoken by said attendant and playing said message spoken by said caller and said message spoken by said attendant to said third party in response to said attendant input.

5. A method as claimed in claim 4 further comprising: before receiving said attendant input, completing said incoming call to said attendant, said message spoken by said attendant including a conversation between said calling party and said attendant.

6. A method for use by a telecommunications system, said method comprising
    receiving an incoming call from a caller, automatically prompting said caller with a generalized request for a message to be spoken by said caller, recording said message spoken by said caller, said message comprising a plurality of words, performing wordspotting to detect any one of a predefined number of words from among said plurality of words contained in said message, some of which plurality of words are not ones of said predefined words and in response to detection of one of said predefined words, playing said recorded message to a third party, selected based on said detected predefined word in response to a failure to detect any of said predefined words, queuing said incoming call and said message, playing said message to an attendant, and in response to input from said attendant after said playing, routing said incoming call to a third party based on said attendant input.

7. A method in accordance with claim 6 further comprising playing said message to said third party in response to said attendant input, following the playing of said message to said third party and in response to an input from said third party, completing said incoming call to a third party, following said completing, recording a voice conversation between said caller and said third party, and in response to a further input from said third party, playing said recorded message and said recorded voice conversation to a fourth party based on said further third party input.

8. A method in accordance with claim 6 further comprising playing said message to said third party in response to said attendant input, following the playing of said message to said third party, but without said third party answering said incoming call, recording a message spoken by said third party, and in response to an input from said third party, playing said message spoken by said caller and said message spoken by said third party to said fourth party based on said third party input.

9. A method for use by a telecommunications system, said method comprising receiving an incoming call from a caller, recording a message spoken by said caller, queuing said incoming call and said message, playing said message to an attendant, in response to input from said attendant, completing said incoming call to said attendant, recording a voice conversation between said caller and said attendant, and in response to further input from said attendant, playing said recorded message and said recorded voice conversation to a third party based on said further attendant input.

10. A method for use by a telecommunication system, said method comprising receiving an incoming call from a caller, recording a message spoken by said caller in response to prompting by said system, queuing said incoming call and said message, said system placing a new outbound call to a first called party, when said new outbound call is answered by said first called party, playing said message to said first called party and subsequently completing said incoming call to said first called party in response to input from said first called party, when said first called party does not answer said new outbound call, said system placing a further outbound call to a second called party, and when said further outbound call is answered by said second called party, playing said message to said second called party and subsequently completing said incoming call to said second called party in response to input from said second called party.

11. A method for use by a telecommunication system, said method comprising receiving an incoming call from a caller, recording a message spoken by said caller in response to prompting by said system, queuing said incoming call and said message, said system placing new outbound calls to a plurality of parties at substantially the same time, playing said message to ones of said parties that answer the new outbound calls, completing said incoming call to one of said answering parties in response to input from said answering party, and interrupting the playing of said message to others of said answering parties to indicate that said incoming call has been completed.

* * * * *